UNITED STATES PATENT OFFICE.

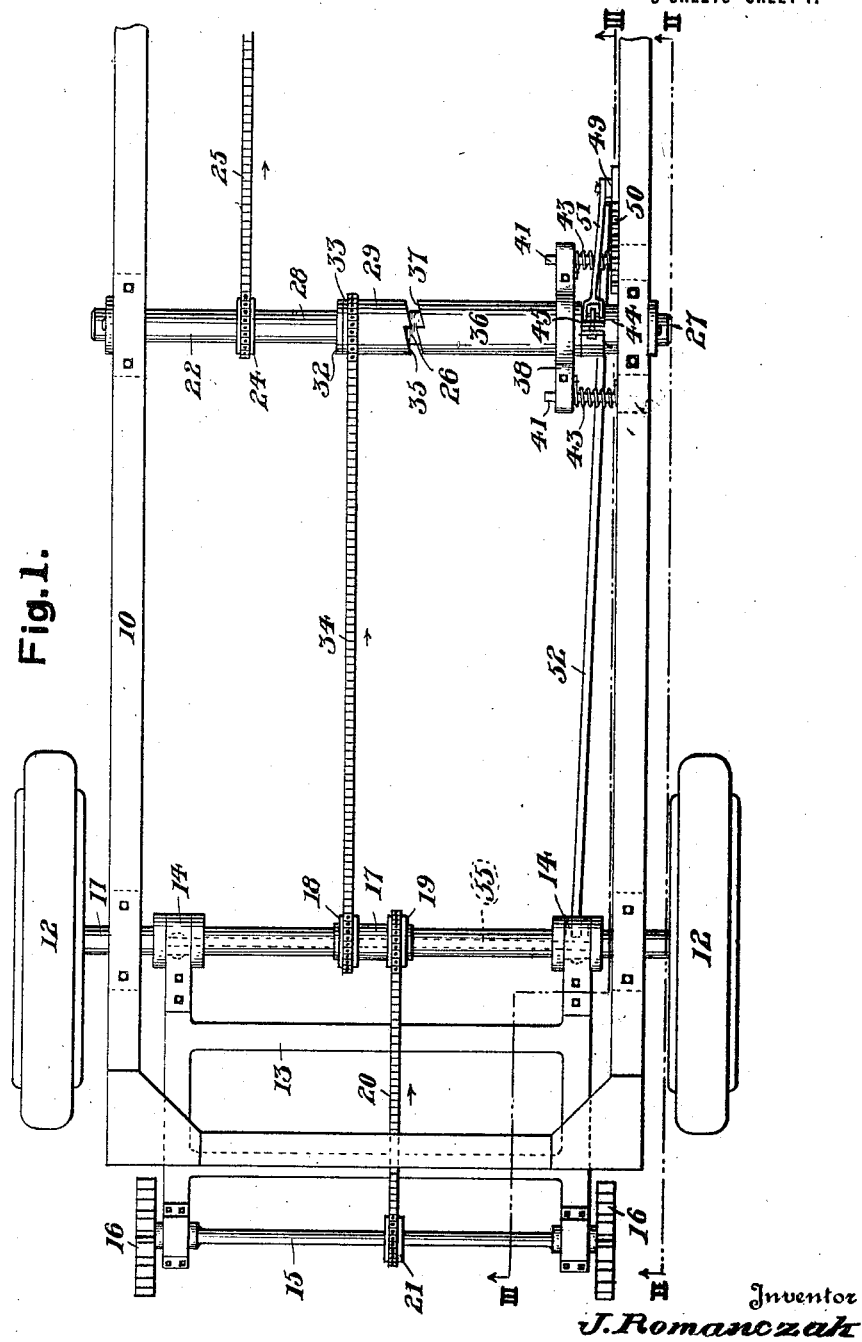

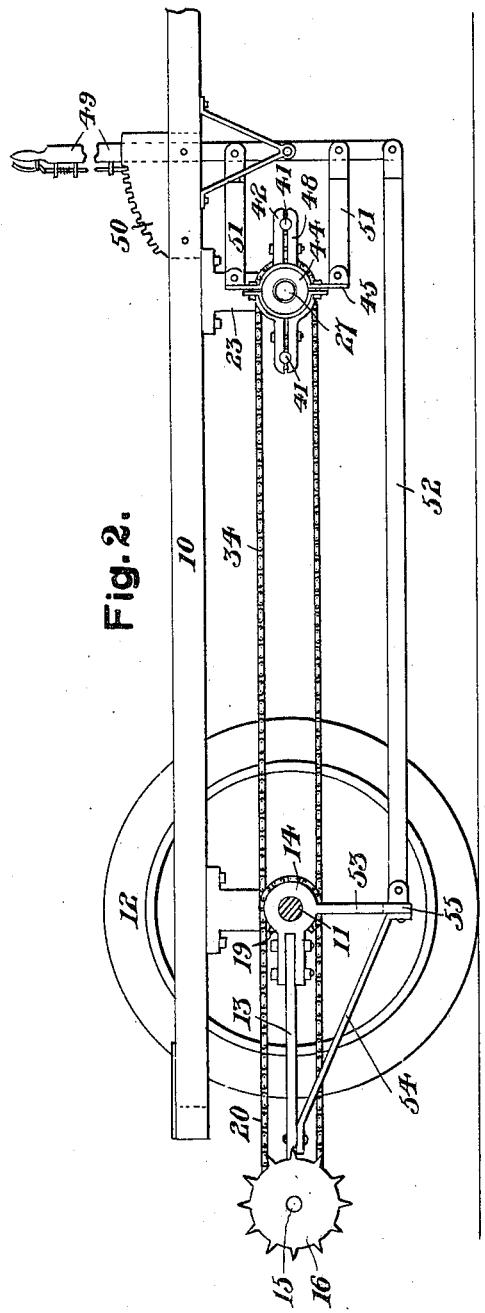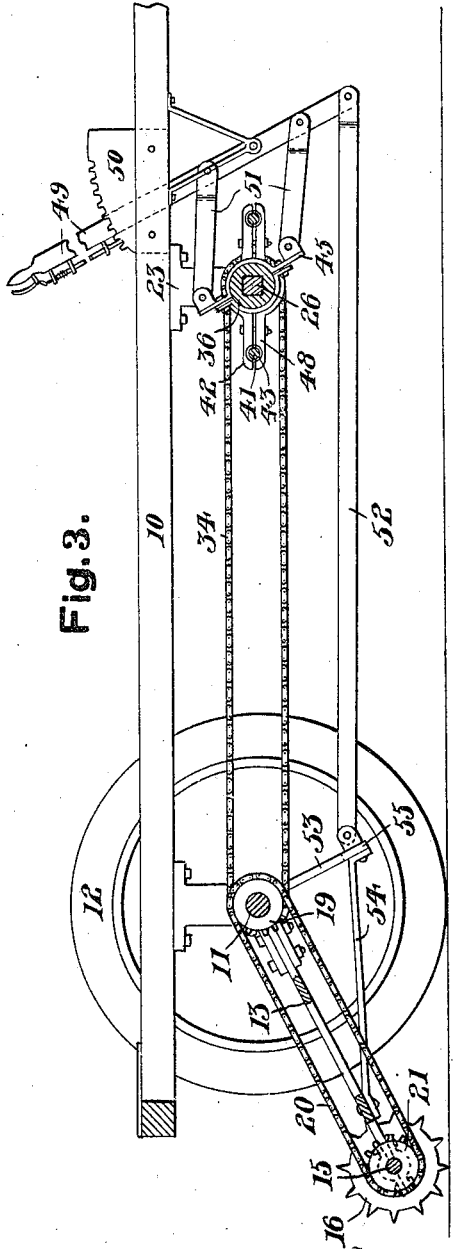

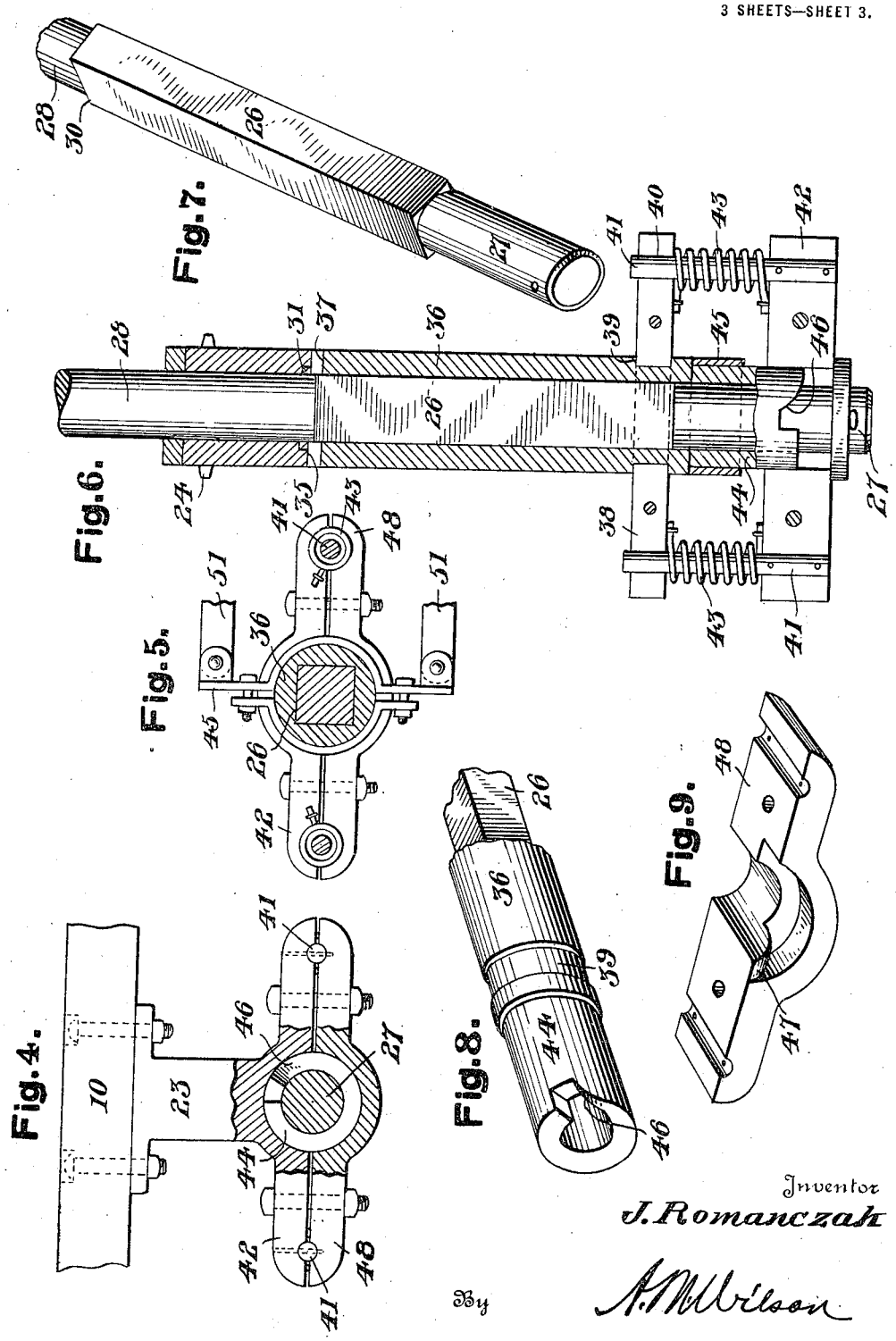

JOEZEF ROMANCZAK, OF PITTOCK, PENNSYLVANIA.

HILL-CLIMBING DEVICE.

1,154,657.  Specification of Letters Patent.  Patented Sept. 28, 1915.

Application filed April 30, 1915. Serial No. 24,986.

*To all whom it may concern:*

Be it known that I, JOEZEF ROMANCZAK, a subject of the Emperor of Austria-Hungary, residing at Pittock, in the county of Allegheny and State of Pennsylvania, have invented certain new and useful Improvements in Hill-Climbing Devices, of which the following is a specification.

This invention relates to new and useful improvements in hill climbing devices.

The primary object of the invention is the provision of auxiliary traction wheels for a vehicle operable by the motive power thereof and adapted for automatic clutching and unclutching with the power means upon the manual shifting of the device to its operative and inoperative positions respectively.

A further object of the invention is to provide auxiliary tractor wheels upon a motor vehicle, such wheels being normally elevated above the road bed when not in use and with the motive power disconnected therefrom but being readily shiftable to their operative road engaging positions and in operative connection with the motive power.

A still further object of the invention is to provide a motor vehicle with a device adapted for imparting additional traction properties to the same and readily shifted to its operative motor propelled position when desired to assist the propelling of the vehicle through mud or sand or up steep grades.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a top plan view of a portion of an automobile chassis having the present invention positioned thereon. Fig. 2 is a side elevation thereof partially in section upon line II—II of Fig. 1. Fig. 3 is a vertical longitudinal sectional view taken upon line III—III of Fig. 1. Fig. 4 is an enlarged detail view of the power shaft bracket showing the movable clutch operating collar. Fig. 5 is a vertical sectional view through the clutch operating member and power shaft. Fig. 6 is a central longitudinal sectional view through the clutching device and its operating means. Fig. 7 is a perspective view of the power shaft. Fig. 8 is a perspective view of a portion of the power shaft and one of the clutch sleeves and the shiftable clutch operating collar, and Fig. 9 is a perspective view of the cam block employed with the clutch operating collar.

Referring more in detail to the drawings, a portion of the rectangular frame 10 of the automobile chassis is shown having a rear axle 11 and the usual rear wheels 12.

A frame 13 preferably formed of metal and substantially rectangular in shape is swingingly journaled upon the rear axle 11 by means of strap brackets 14 and has a shaft 15 transversely journaled in its free end, ground engaging spiked traction wheels 16 being secured to the opposite ends of the said shaft.

A sleeve 17 is journaled substantially centrally upon the rear axle 11 and carries spaced sprocket wheels 18 and 19. The sprocket wheel 19 is connected by a sprocket chain 20 with a sprocket wheel 21 secured to the said shaft 15.

A power shaft 22 is transversely journaled in opposite depending brackets 23 of the frame 10 forwardly of the rear axle 11 and is provided with a sprocket wheel 24 over which a power sprocket chain 25 operatively passes, the said sprocket chain 25 being operatively connected to the propelling motor of the vehicle. The said power shaft 22 is divided into a squared portion 26 positioned between a short cylindrical end portion 27 and relatively longer cylindrical opposite end portion 28. It is to be noted that the sprocket wheel 24 is secured to the cylindrical portion 22 and that a short sleeve section 29 is freely journaled upon the said shaft portion at a point adjacent the shoulder 30 of the said shaft which marks a separation between the squared and longer cylindrical portion thereof. The sleeve 29 is cut away as at 31 at its inner end for allowing the said shoulder 30 to act as a positioning means at one side thereof while a fixed collar 32 upon the shaft portion 28 acts as a stop at the opposite end of the sleeve 29 and thus the said sleeve is restrained from longitudinal movement but is capable of independently revolving upon the shaft. The sprocket wheel 33 is carried by the sleeve 29 and a sprocket chain 34 passes thereover and also over the aforementioned sprocket wheel 18.

The short clutch sleeve 29 has an outer engaging clutching face 35 and a relatively long clutch sleeve 36 is longitudinally slidably mounted upon the squared portion 26 of the power shaft and has a coöperative end clutching surface 37 positioned opposite the coöperating short sleeve clutch face 35. The long clutch sleeve 36 is normally held out of engagement with the short clutch sleeve 19 by means of a clamping collar 38 journaled within an annular groove 39 of the clutch sleeve 36 and having perforations 40, through which pins 41 slidably project while the opposite outer ends of the said pins are secured within a fixedly mounted clamp collar 42 which forms a part of the adjacent journaling bracket 23, it being noted that compression springs 43 surround the said pins 41 and are connected between the clamp collars 42 and 38. A clutch operating sleeve 44 is journaled upon the shorter cylindrical portion 27 of the power shaft and is provided with an operating clamp 45 annularly secured thereto, the said clamp being adapted to be partially rotated for the purpose of imparting partial revolutions to the sleeve 44. The outer end of the sleeve 44 has an inwardly extending cam face 46 which is adapted to be brought into shifting engagement with a similar cam face 47 carried by one of the members 48 of the fixed clamp sleeve 42 heretofore mentioned.

An operating lever 49 is pivoted to the frame 10 at a point adjacent the driver's seat (not shown) and is provided with the usual adjustment retaining rack 50. Pivotal links 51 are connected between the lever 49 and the opposite ends of the clamp 45 of the clutch operating sleeve 44, while a link 52 is pivotally connected between the lower end of the lever 49 and the free end of one of the arms 53 carried by the journaling members 14, while opposite spaced braces 54 are connected between the frame 13 and the said arms 53, and a transverse brace 55 connects together the free ends of the arms 53.

From this detailed description of the device, the complete operation thereof will be apparent, the normal inoperative position of the elements being disclosed in Fig. 2 and in which position the lever 49 and link 52 and the connecting and mounting elements will hold the frame 13 in a substantially horizontal position and with the wheels 16 elevated above the road bed, while the cam faces 46 and 47 of the clutch operating sleeve 44 and the clamp collar 48 respectively will be out of engagement with each other, thus allowing the springs 43 to hold the clutch sleeve 36 out of engagement with the clutch sleeve 29. In this position of the device the motor may freely turn the power shaft 22 without imparting movement to the clutch sleeve 29, but at which time however the clutch sleeve 36 is constantly turned while the clutch operating sleeve 44 remains stationary. By shifting the lever 49 to its operative position as shown in Fig. 3 the link 52 will be forwardly shifted for forcing the traction wheels 16 into operative engagement with the road bed. This movement of the lever 49 also imparts a partial revolution to the clutch operating sleeve 44 by means of the connecting links 51 and this movement of the said sleeve forces the cam face 46 thereof to ride upon the cam face 47 of the clamp member 48, which action separates the sleeve 44 from the clamp member 48 and moves the said sleeve inwardly by sliding the same longitudinally upon the cylindrical portion 27 of the power shaft. The clutch operating sleeve 44 is brought by this motion against the outer end of the longer clutch sleeve 36 and thereby slides the same upon the power shaft portion 26 and engages the cam faces 37 and 35. The said members remain so clutched up as long as retained in their said positions by the lever 49, while a shifting of the said lever to its inoperative position as shown in Fig. 2 allows the compression springs 43 to slidably move the clutch sleeve 36 as well as the operating sleeve 44 outwardly and disconnecting the clutch. A simultaneously operating power clutch is thereby provided in connection with the shiftable auxiliary traction wheels 16.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What I claim as new is:—

1. A vehicle frame, shiftable auxiliary traction wheels, a power shaft, clutch means between the said power shaft and wheels and simultaneously operating means for said clutch means and shifting means for the said wheels.

2. A device of the class described comprising a vehicle frame having an axle and a power shaft transversely carried thereby, a frame swingingly mounted upon the said axle, auxiliary spiked traction wheels carried by the said frame, a clutch sleeve freely journaled upon the said power shaft, operative connections between the said sleeve and wheels, a long clutch sleeve non-rotatably mounted upon the said power shaft, and means for shifting the said sleeves into clutching engagement with each other.

3. A device of the class described comprising a vehicle frame, an axle carried thereby, an auxiliary frame pivoted to the said axle, auxiliary traction wheels journaled in the said pivoted frame, a power shaft having terminal cylindrical portions and an intermediate squared portion, a clutch sleeve journaled upon the inner one of said cylindrical portions, operative connections between the said clutch sleeve and the said traction wheels, a coöperating clutch member slidably mounted upon the said squared portion, a clamp bracket journaled to the said clutch member, clutch releasing compression springs connected between the said clamp member and vehicle frame.

4. A device of the class described comprising a vehicle frame, an axle carried thereby, an auxiliary frame pivoted to the said axle, auxiliary traction wheels journaled in the said pivoted frame, a power shaft having terminal cylindrical portions and an intermediate squared portion, a clutch sleeve journaled upon the inner one of said cylindrical portions, operative connections between the said clutch sleeve and the said traction wheels, a coöperating clutch member slidably mounted upon the said squared portion, a clamp bracket journaled to the said clutch member, clutch releasing compression springs connected between the said clamp member and vehicle frame, a clutch shifting sleeve journaled upon the outer cylindrical portion of the power shaft and having an outer cam face, a fixed clamp member having a corresponding cam face operatively positioned adjacent the said clutch operating sleeve, a clamp secured to the said operating sleeve and an operating lever pivotally connected to the said clamp.

5. A motor vehicle frame having a rear axle and a power shaft transversely supported thereby, auxiliary traction wheels swingingly carried by the said axle, a clutch sleeve journaled upon the said power shaft, operative connections between the said clutch sleeve and traction wheels, clutching means between the said power shaft and clutch sleeve, an operating lever for the said clutching means, automatic releasing means for the said clutching means.

6. A motor vehicle frame having a rear axle and a power shaft transversely supported thereby, auxiliary traction wheels swingingly carried by the said axle, a clutch sleeve journaled upon the said power shaft, operative connections between the said clutch sleeve and traction wheels, clutching means between the said power shaft and clutch sleeve, an operating lever for the said clutching means, automatic releasing means for the said clutching means, and operative shifting means for the said traction wheels pivotally connected to the said lever.

In testimony whereof I affix my signature in presence of two witnesses.

JOEZEF ROMANCZAK.

Witnesses:
 FRED R. PAPST,
 JOSEF WINNICKI.